(12) United States Patent
Rossi et al.

(10) Patent No.: US 6,852,796 B2
(45) Date of Patent: Feb. 8, 2005

(54) SILICONIC BICOMPONENT COMPOSITION, PROCESS FOR THE PREPARATION OF SAID COMPOSITION

(75) Inventors: Massimo Rossi, Grignano Polesine (IT); Marco Pasqualini, Badia Polesine (IT)

(73) Assignee: Zhermack S.p.A., Badia Polesine (IT)

( * ) Notice: Subject to any disclaimer, the term of this patent is extended or adjusted under 35 U.S.C. 154(b) by 0 days.

(21) Appl. No.: 10/436,295

(22) Filed: May 12, 2003

(65) Prior Publication Data

US 2004/0006172 A1 Jan. 8, 2004

(30) Foreign Application Priority Data

Jul. 5, 2002 (EP) .................................. 02425443

(51) Int. Cl.⁷ .............................................. C08L 83/04
(52) U.S. Cl. ........................ 524/588; 524/284; 524/81
(58) Field of Search ................. 524/588, 284, 524/81

(56) References Cited

U.S. PATENT DOCUMENTS 2,938,007 A * 5/1960 Savage ....................... 524/296
4,076,685 A * 2/1978 Kogler ....................... 523/139
4,499,230 A * 2/1985 Lockhart .................... 524/450
4,918,121 A * 4/1990 Peccoux et al. .............. 524/27

FOREIGN PATENT DOCUMENTS

| EP | 0 738 511 A1 | 10/1996 |
|---|---|---|
| EP | 0 738 511 B1 | 9/2001 |
| GB | 788943 | 1/1958 |
| WO | WO 96/32927 | 4/1996 |

OTHER PUBLICATIONS

Patent Abstracts of Japan, vol. 018, no 591 (C–1272). (Nov. 11 1994) & JP 06 220423 A (Hokko Chem Ind Co Ltd. Others: 01). (Aug. 9, 1994).

* cited by examiner

*Primary Examiner*—Kuo-Liang Peng
(74) *Attorney, Agent, or Firm*—Pearne & Gordon LLP

(57) ABSTRACT

It is disclosed a sealing siliconic bicomponent composition devoid of toxicity and easily applicable. In addition it is disclosed a process for preparation of said composition and related use of same for tiles and sanitary fixtures for expositive purposes.

15 Claims, No Drawings

SILICONIC BICOMPONENT COMPOSITION, PROCESS FOR THE PREPARATION OF SAID COMPOSITION

FIELD AND BACKGROUND OF THE INVENTION

The present invention relates to a siliconic bicomponent composition as an imitation of a cementitious material, as well as to a process for preparation of same. In addition, the present invention also pertains to the use of said composition to apply tiles or sanitary fixtures for expositive purposes.

In the production of tile flooring and building covering, use of baked clay, fired bricks, grès (stoneware), porcelain grès, clinker and marble is commonly provided. The above articles of manufacture are widely used in expositive panels and installations for exhibition purposes, in fairs, shops and windows for example.

Also in the field of the sanitary fixtures (washbasins, bathtubs, bathrooms), demonstrative and promotional installations are usually executed to enable exhibition of the sanitary fittings exactly as adapted for use.

Although the above mentioned installations are quite provisional and can be replaced when renewal of the goods array or dismantling of the exhibition stands is carried out, the spaces between the tiles (gaps) or the tiles and the sanitary fixtures are to be always filled with plasters so as to approach reality as much as possible. For the purpose gypsum-based or cement-based materials are commonly employed. However, gypsum or cement-based materials are not very homogeneous and are difficult to lay and clean. In addition, gypsum or cement-based materials, if used in exhibition stands, are of difficult transportation because cracks are easily formed due to vibrations during transportation.

When said materials are used in big exhibitions, dismantling and recovery of the ceramic articles of manufacture is also difficult due to adhesion of the cement therein employed.

In order to obviate the above drawbacks, silicone-based bicomponent formulations (consisting of a paste as a base and a catalyst) have been recently used.

Said formulations are of easy application and easy cleaning. In addition, as they are flexible, they are not likely to suffer from cracking. Furthermore, said formulations can be easily removed without leaving residues on the ceramic articles of manufacture.

It is known that said formulations consist of siliconic polymers such as polydimethylsiloxane having siloxane terminations (SiOH). Hardening of said formulations is reached through cross-linking of the silicone polymers by alkylsilicates, tri and tetra alkylsilicates (cross-linkers) for example, in the presence of tin-based (Sn) catalysts.

In addition, the cementitious-material look is commonly obtained with the aid of silica sands, quartz, micro balls, calcium carbonates or infusorial earths.

It is known however that said formulations consisting of siliconic polymers can be easily applied and quickly laid, following the method hereinafter set out, for example.

First of all, the previously described compositions are mixed by hand or a mixing machine with an appropriate amount of catalyst.

The thus obtained mixture is introduced into an applicator or caulking gun. The applicator or caulking gun is substantially formed of a hollow cylinder provided with a compressed-air piston pushing the mixture through an outlet nozzle of conical shape. Obviously, the nozzle diameter is suitable for distribution of an appropriate amount of mixture to be applied to the gaps.

Once the mixture has been applied, it is quickly spread by use of appropriate tools and possibly cleaned with a cloth.

At this point it is necessary to wait for hardening of the applied mixture by the catalyst.

Unfortunately, the main drawback of the above method is that the mixture must be sufficiently fluid so as to quickly pass through the applicator's nozzle. If the mixture does not quickly pass through the applicator's nozzle the application times are inevitably lengthened which will bring about an increase in costs.

On the other hand, said siliconic mixture with mineral fillers is rather sticky by itself and tends to adhere to the inner walls of the applicator thereby slowing down discharging of said mixture.

In order to eliminate the drawbacks present in the formulations consisting of the above mentioned siliconic polymers, accomplishment of products with lubricating fats and/or Vaseline fats is known, which fats however are very sensitive to temperature. In fact, in the cold season said products containing lubricating fats and/or Vaseline fats get hard, which will prevent extrusion of same.

Recently plasticisers have been used in place of said lubricants.

As known, phthalates such as dioctylphthalate and, mainly, diisononylphthalate in concentrations even as high as 7% have been in particular used as the plasticisers.

However, during hardening of the mixture containing the above mentioned phthalates, a quick degradation of the mechanical properties of the hardened product has been ascertained.

In addition, the phthalate-containing mixture must be carefully handled due to the high toxicity or, at all events, the questionable toxicity of phthalates making the mixture hardly adapted to be handled without particular precautions because phthalates tend to migrate to the surface and pollute all surfaces with which they come into contact.

There are many medical documents concerning studies on toxicity of phthalates.

For instance, studies on dioctylphthalate (DOP) were made following cases of bronchial asthma due to exposition during work (Brunetti G et al.; Med. Lav., 1975, 2, 120–4). Phthalate absorption is also possible through the skin (Elsisi A E et al; Fundam. Appl. Toxicol., 1989, 12:1, 70–7). The metabolites of some phthalates were found and analysed in human urine (Blount B D et al.; Environ health Perspect, 2000, 108:10 979–82). The negative effects in laboratory tests were found in different studies among which the following can be mentioned: modification of the hepatic activity with an increase in peroxisomes and accumulation of fats in liver; changes in the thyroid and testicle activity caused by DOP (Howarth J A et al.; Toxicol. Lett., 2001, 121:1, 35–43/David R M, Toxicol. Sci. 50, 195–205/David R M et al.; Toxicol. Sci., 2000, 58:2, 377–85); liver hyperplasia and neoplasia caused by DOP (Willhite C C, Toxicology, 2001, 160:1, 219–26); liver and kidney cancer caused by di(isononyl)phthalate (DINP) but from non genotoxic processes (Mc Kee R H et al.; Appl. Toxicol. 20:6, 491–7); fetal malformation concerning development of the genital male characters from DOP and DINP (Parks L G et al.; Toxicol. Sci. 200, 58:2, 339–49/Foster P M et al.; Hum. Rep. Update, 7:3, 231–5/Moore R W et al.; Environ Health Perspect, 2001, 109:3, 229–37); and estrogenic effects with premature development of the female characters (Caro D et al.; Environ Health Perspect 2000, 108:9, 895–900).

In the light of the above, it is apparent that use of mixtures with phthalates must exclusively take place with particular precautions (use of gloves and masks by the operator, for example) that can hinder or at least slow down the application, thereby adversely affecting costs for setting up.

In addition, the phthalates present in the mixtures can be absorbed by the support panel adapted for exhibitions, generally made of chipboard, which will become a further source of pollution.

Also known on the market is the presence of silicone-based bicomponent compositions comprising inert fillers and a hydrocarbon oil as the lubricating agent capable of promoting extrusion through the applicator's outlet nozzle without having any toxicity. In fact said hydrocarbon oils are quite inert and are sometimes used in medicine or agriculture.

However, the Applicant has noticed that said hydrocarbon oils present in the silicone-based bicomponent composition have the disadvantage of migrating to the upper surface of the hardened material. In this way the plastered gap can appear glossy, slightly greasy and at all events aesthetically different from cement-based products. In addition, an accumulation of dust could be observed in time which makes laying of tiles for example unaesthetic.

Therefore, there is a need for availability on the market of a silicone-based bicomponent composition that does not show the drawbacks of the known art.

In particular there is a need for availability on the market of a silicone-based bicomponent composition that can be easily extruded by the applicator or caulking gun and, at the same time, does not contain toxic products. The technical problem tackled in the present invention was to make a bicomponent composition comprising siliconic polymers and a catalyst capable of promoting extrusion through the applicator's outlet nozzle without being toxic for the operator and the environment.

The Applicant has found a solution to this technical problem; in fact the Applicant found it useful to prepare a bicomponent composition comprising siliconic polymers, a catalyst, inert fillers admixed with particular compounds.

It is a first aim of the present invention to provide a bicomponent composition comprising one or more siliconic polymers, a catalyst, inert fillers admixed with particular compounds the features of which are set out in the appended independent claim.

Advantageously, the composition being the object of the present invention has a more reduced extrusion time than the compositions of the known art.

Advantageously, the composition being the object of the present invention, once hardened, appears like an opaque material capable of imitating a cementitious material. Advantageously, the composition being the object of the present invention is not toxic for the operator and the environment.

Should a hydrocarbon oil be added into the composition being the object of the invention the particular compounds selected by the Applicant are adapted to reduce surface migration of the hydrocarbon oils. Practically, the gap filled with plaster by use of the composition of the invention does not appear greasy, keeps an opaque appearance in time and is like a gap filled with a cement-based material.

In addition, the composition being the object of the present invention enables surface migration of the hydrocarbon oil (towards the upper surface external to the gap) to be reduced and, at the same time, promotes the extrusion speed of the composition reaching a good compromise with the mechanical properties such as resistance to compression, reduction of linear shrinkage and resistance to scratching.

The siliconic composition of the present invention is of the type comprising two components (a bicomponent composition); i.e. it is formed of a paste as a base and a catalyst that are mixed together at the moment of use. The catalyst of the composition of the invention can be selected from those commonly used.

Furthermore, the composition comprises inert fillers (inert materials) commonly employed by those skilled in the art. Preferably, the composition comprises mineral fillers and organic and/or inorganic pigments.

In particular, said bicomponent composition has the base paste consisting of an appropriate siliconic polymer or a mixture of siliconic polymers.

The siliconic polymer or mixture of siliconic polymers can be selected from the reactive siliconic polymers or unreactive siliconic polymers.

The composition being the object of the invention further comprises at least one particular compound selected from a dicarboxylic acid ester, a citrate or a citric acid diester or mixtures of the same compounds.

In addition, the composition being the object of the invention may further comprise a hydrocarbon oil.

Advantageously, the hydrocarbon oil is selected from Vaseline oils. However, other types of hydrocarbon oils can be efficaciously employed in the present invention. Advantageously, the siliconic polymer of the base paste of the composition of the present invention is selected from the polymers of the general formula (I):

$$A_n\text{—}SiR^1{}_{3-n}O(SiR^1{}_2O)_m SiR^1{}_{3-n}\text{—}A_n \qquad (I)$$

wherein:

$R^1$ is selected either from a monomer or polymer of a linear or branched and possibly substituted saturated or unsaturated hydrocarbon; or from an aromatic group;

n is selected from an integer included between 1 and 3;

m is selected from an integer included between 10 and 15000;

$A_n$ is a hydrolysable $Y_n$ group or an hydroxyl group or a non hydrolysable $R^2{}_n$ group wherein:

Y is selected from amino, acylamino, aminoxy, oximo, alkoxy, acyloxy and alkylamino groups, n is as above defined, and $R^2{}_n$ is defined as $R^1$.

Preferably, when $R^1$ is a monomeric or polymeric substituted monovalent hydrocarbon group, n is 1, 2, 3, m is a positive integer and $A_n$ is $Y_n$ as above defined or an hydroxyl group.

For example, when $R^1$ stands for a saturated monomeric unsubstituted hydrocarbon it may be a methyl, ethyl, propyl, butyl, hexyl and octyl radical.

Preferably, when $R^1$ stands for a saturated monomeric unsubstituted hydrocarbon, it is a methyl radical. Whereas, for example, when $R^1$ stands for an unsaturated monomeric unsubstituted hydrocarbon, it can be a vinyl, allyl and butadienyl radical.

Preferably, when $R^1$ stands for an unsaturated monomeric unsubstituted hydrocarbon, it is a vinyl radical; at least by 50%, for example.

In addition, for example, when $R^1$ is an aromatic group like the aryl and alkylaryl radicals, preferably $R^1$ is a phenyl radical. By alkyl radical it is intended linear or branched hydrocarbon chains containing 1 to 66 carbon atoms such as methyl propyl, ethyl, butyl, sec-butyl, tert-butyl, pentyl, hexyl.

For example when $R^1$ is substituted it is selected from: 3,3,3,-trifluoropropyl, chlorophenyl, bromotolyl and cyanoalkyl radicals.

And yet, when $R^1$ is a polymer or a copolymer, $R^1$ for example is formed of unsaturated monomers such as styrene, ethylene, vinylacetate. The hydrocarbon chain is bound to silicone with a C—C bond.

In the siliconic polymer of the present invention, when $A_n$ is a hydrolysable group $Y_n$ can be for example n-butylamino, sec-butylamino, cyclohexylamino, benzoylmethylamino, dimethylaminoxy, diethylaminoxy, dipropylaminoxy, acetophenone oxime, acetone oxime, benzophenone oxime, methylethyl ketoximo, diisopropyl ketoximo, metoxy, etoxy, n-propoxy, isopropoxy, butoxy, hexyloxy, heptyloxy, octyloxy, formyloxy, acetoxy, propionyloxy, caproyloxy, stearoiloxy.

Preferably, in the present invention $A_n$ is a hydroxyl group and therefore the preferred polymers are siloxane group-terminated polydiorganoxyloxanes.

Advantageously, in the formula of the siliconic polymer of the present invention m can be included between 10 and 15000. Obviously the value of m determines the viscosity of the polymer that can be used with different viscosities or mixtures of different viscosities.

Advantageously, in the siliconic polymer of the present invention m is from 100 to 2000 when $A_n$ represents a hydrolysable or hydroxyl group. Preferably, in said case, the siliconic polymer concentration in the base paste is 1–50%; preferably 3 to 35% by weight.

In a preferred embodiment, the siliconic polymer or the mixture of siliconic polymers may contain a polymer of formula (II):

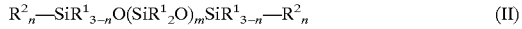   (II)

wherein $R^1$ is as above defined; and $R^2$ is a non hydrolysable group. The group $R^2$ can be defined like $R^1$ or in a different manner. Preferably, $R^1$ and $R^2$ are alkyl groups, the methyl group for example.

Advantageously, in the siliconic polymer of the present invention m is included between 10 and 1500, when $A_n$ represents a non hydrolysable group $R^2_n$.

Preferably, in said case, the siliconic polymer concentration in the base paste is 0.2–10% by weight.

More preferably, also present in the present invention are mixtures of different viscosities of said siliconic polymers.

The composition in the base paste contains a hydrocarbon oil, preferably Vaseline oil. Said oil is commonly obtained after treatment of mineral oils of petroliferous origin with a sulphuric acid, neutralization with soda and subsequent treatment with soda and decolorants. In said oils di-α-tocopherol (vitamin E) can be possibly added. The hydrocarbon oil or Vaseline oil is commonly put on the market with different viscosities.

Preferably, the hydrocarbon or Vaseline oils of the present invention have a viscosity included between 15 and 400 cp.

Preferably, in the present invention, the concentration of said oils is included between 1 and 20% in the base paste; preferably between 3 and 10% by weight.

The composition of the present invention further comprises at least one compound selected from either an ester of a dicarboxylic acid, a citrate or a diester of a citric acid, or a mixture of the above compounds.

The ester of the dicarboxylic acid used as an opacifying agent and/or an agent for adjusting surface migration of the hydrocarbon oil, Vaseline oil for example, is selected from the compounds of formula (III):

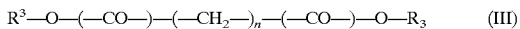   (III)

wherein $R^3$ is a linear or branched saturated alkyl group comprising 1 to 15 carbon atoms; and n is an integer included between 1 and 16.

For example, the carboxyl acids of the present invention can have the glutaric acid (n=3), adipic acid (n=4), azelaic acid (n=7) and sebacic acid (n=8).

The alcohols esterifying the dicarboxylic acids of the present invention can be for example: butylic acid, octylic acid or 2-ethyl hexanoic, isononylic, isodecylic acids or alcohol mixtures having 7 to 9 carbon atoms. Alternatively, mixtures of esters of dicarboxylic acids can be also used.

Preferably in the present invention said esters of dicarboxylic acids are present with a concentration of 0.1 to 5%, preferably 0.5 to 3% by weight.

Another class of compounds to be used as opacifying agents and agents for adjusting surface migration of the Vaseline oil are derivatives of the citric acid.

A diester of the citric acid is selected from the compounds of formula:

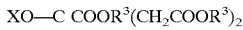

wherein
the group $R^3$ has been previously described and the n-butyl, n-hexyl, 2-ethylhexyl, octyl, decyl, octyldecyl groups can be mentioned as examples.

The group X can be an atom of hydrogen or an ester group of the type $(R^3_aCO—)$.

For example, the group X is the acetyl ($R^3_a$=$CH_3$—) or butyril ($R^4$=$CH_3$ $(CH_2)_2CH_2$—) group.

In the base paste of the composition of the present invention commonly used mineral fillers are included such as silica sands, quartz, calcium carbonate, talc, mica, glass micro balls, ground glass, sepiolite, infusorial earth. Said fillers are important for achieving the final aesthetic effects, viscosity of the mixture and resistance to compression.

Preferably, the concentration of said fillers is included between 10 and 95% of the base paste; more preferably between 40 and 90% by weight.

Finally, in a bicomponent composition as that of the present invention, the catalyst usually consists of:

a cross-linker with the general formula $R^4_mSi(OR^5)_{4-m}$ or general formula $(R^5O)_3Si[OSi(OR^5)_2]_nOSi(OR^5)_3$ wherein $R^4$ and $R^5$ have the same meaning as $R^1$ as above described;

a commonly used catalyst such as, for example, tin 2-ethylhexanoate, dibutyl tin dioctoate, dibutyl tin diacetate, dibutyl tin dilaurate, iron 2-ethylhexanoate, cobalt 2-ethyl hexanoate, manganese 2-ethyl hexanoate, zinc 2-ethyl hexanoate, tin naphthenate, tin oleate, tin caprilate, tin butyrate, titanium naphthenate, zinc naphthenate, cobalt naphthenate, zinc stearate, tetrabutyl titanate, tetra 2-ethylhexyl titanate.

Usually the catalyst is incorporated at the moment of use of the siliconic composition, in the base paste in an amount in the range of 1 to 10%, preferably 1 to 6%.

It is a further object of the present invention to provide a process for preparation of said sealing siliconic bicomponent composition the features of which are set out in the appended independent claim.

The composition components, being the object of the invention are mixed with each other by use of suitable mixing machines, commonly used in the art such as mixing machines of the planetary type for example or double-Z blenders until the final composition of a homogeneous consistency ready for use is obtained.

The process involves mixing of some components of the composition in order to obtain a non definitive intermediate composition.

Subsequently, the process contemplates introduction (through mixing) of the remaining components into said non definitive intermediate composition until achievement of the final composition having the consistency of a homogeneous paste ready for use.

In a preferred embodiment of the present invention, a given amount of siliconic polymer or of a mixture of siliconic polymers is set in a container. Said container is equipped with heating means and mixing means. Under stirring there is addition of: the inert material selected from the inert fillers, mineral fillers, organic and/or inorganic pigments; hydrocarbon oil; and a compound selected from an ester of dicarboxylic acid, a citrate and a diester of a citric acid or a mixture of these compounds.

Depending on the type of material that is wished to be obtained addition of the components takes place following a given order.

All components are maintained under stirring until a non definitive intermediate composition is obtained.

In this case the catalyst is incorporated to an appropriate amount into the above intermediate composition at the moment of use of the composition being the object of the present invention.

In another preferred embodiment of the present invention a given amount of siliconic polymer or of a mixture of siliconic polymers is disposed in a container. Said container is equipped with heating means and mixing means. Under stirring there is addition of: the inert material selected from inert fillers, mineral fillers, organic and/or inorganic pigments; the hydrocarbon oil. Depending on the type of material that is wished to be obtained addition of the components takes place following a given order.

All components are maintained under stirring until a non definitive intermediate composition is obtained.

In this case the catalyst and a compound selected from an ester of a dicarboxylic acid, a citrate and a diester of a citric acid or a mixture of these compounds are mixed together and incorporated in an appropriate amount into the above described intermediate composition at the moment of use of the composition being the object of the present invention.

Alternatively, the process contemplates preparation of an intermediate composition comprising a siliconic polymer or a mixture of siliconic polymers; the inert material and a hydrocarbon oil. At the moment of use a catalyst and, separately, a compound selected from an ester of a dicarboxylic acid, a citrate and a diester of a citric acid or a mixture of these compounds can be added.

It is a further object of the present invention to provide use of the sealing siliconic bicomponent composition the features of which are set out in the appended independent claim.

In fact, the composition of the present invention can be employed for preparation of a material similar to cement for laying of ceramic or sanitary fixtures in fair stands or exhibitions in general.

Some examples are given hereinafter for illustrative purposes only, without however having a limiting character.

EXAMPLE 1

Control Example

A mixture is prepared which consists of a SiOH-terminated siliconic polymer of a viscosity of 20000 cp and in an amount of 8%, 6% talc, 78% micro balls, 8% Vaseline oil until a homogeneous paste is obtained.

EXAMPLE 2

A mixture is prepared which consists of a SiOH-terminated siliconic polymer of a viscosity of 20000 cp and in an amount of 8%, 6% talc, 78% micro balls, 6% Vaseline oil and 2% diisononyladipate until a homogeneous paste is obtained.

EXAMPLE 3

A mixture is prepared which consists of SiOH-terminated siliconic polymer of a viscosity of 20000 cp and in an amount of 8%, 6% talc, 78% micro balls, 6% Vaseline oil and 1% diisononyladipate and 1% trimethylsiloxy-terminated silicone oil until a homogeneous paste is obtained.

EXAMPLE 4

Commercial Control Example

A product present on the market containing a SiOH-terminated siliconic polymer, inert fillers and diisononylphthalate in an amount of 7% by weight.

EXAMPLE 5

The compositions prepared in Examples 1, 2, 3 and 4 have been submitted to the following tests:

extrusion time for 500 g of product by a dispensing gun type T18X manufactured by M. KROGER Masknfabric A/S, Denmark with an outlet hole of a 5 mm diameter and 108 mm cone length adjusted for an operating pressure of 8 bars;

apparent viscosity measured through measurement of the force necessary for extrusion of the material through the capillary tube of a 3.8 mm diameter and 17.3 mm length by a 30 mm diameter piston at a speed of 100 mm/minute (shear rate 26.59 s-1).

The obtained results are reproduced in Table 1.

It is possible to see that for the compositions of Examples 1–3, the extrusion times and apparent viscosities are lower than those of the material containing isononylpththalate (Control Example 4).

EXAMPLE 6

For evaluation of the features of the hardened material, 3% of a catalyst containing 2% of tin such as dibutyl tin dilaurate in tetrapropylsilicate, has been incorporated into the mixtures of Examples 1, 2, 3 and 4. After 24 hours from mixing with the catalyst, some tests have been carried out on the compositions and the results are reproduced in Table 1, together with the results of Example 4: surface shine by visual examination [(+)→shiny (+++++)→very opaque];

oil transfer measured through the size difference in the diameters of a spot formed on a A4 sheet put under a 4 mm thick disc of a diameter of 100 mm obtained with 80 g of the product;

resistance to compression based on UNI EN 21563 regulations;

Shore A hardness following ASTM 2240 standards;

surface hardness (pencil hardness) following ASTM D3363 standards (7B-6B-2B-B-HB-H-3H-4H-4H-5H-6H-7H-8H-9H (soft→extra-hard).

TABLE 1

| PROPERTIES | COMPOSITION (Control) Example 1 | COMPOSITION Example 2 | COMPOSITION Example 3 | COMPOSITION (Control) Example 4 |
|---|---|---|---|---|
| Extrusion Time (S) | 33 | 31 | 35 | 83 |
| Viscosity (Pas) | 152.6 | 91.2 | 197.9 | 306.7 |
| Shore A Hardness after 72 hours | 88 | 81 | 77 | 79 |
| Resistance to compression (MPa) | 2.32 | 2.25 | 2.25 | 1.98 |
| Resistance to scratches | B | 2B | 6B | 6B |
| Oil loss (mm) | 23.5 | 38.5 | 16 | 97.5 |
| Surface opacity | + | ++++ | +++ | ++++ |

As can be noticed from Table 1, the compositions of Examples 2 and 3 as compared with the (Control) Example 1 have a greater surface opacity without impairing hardness and resistance to compression too much. In the composition of Example 3 oil transfer is also reduced.

EXAMPLE 7

Control

A mixture is prepared which consists of SiOH-terminated siliconic polymer of a viscosity of 20000 cp and in an amount of 7.6%, 19.2% talc, 15% calcium carbonate, 50% silica sand, 8.2% Vaseline oil until a homogeneous paste is obtained.

EXAMPLE 8

A mixture is prepared which consists of SiOH-terminated siliconic polymer of a viscosity of 20000 cp and in an amount of 7.6%, 19.2% talc, 15% calcium carbonate, 50% silica sand, 6.8% Vaseline oil, 1.4% isodecyladipate until a homogeneous paste is obtained.

EXAMPLE 9

A mixture is prepared which consists of SiOH-terminated siliconic polymer of a viscosity of 20000 cp and in an amount of 7.6%, 19.2% talc, 15% calcium carbonate, 50% silica sand, 6.8% Vaseline oil, 1.4% dioctylsebacate until a homogeneous paste is obtained.

EXAMPLE 10

A mixture is prepared which consists of SiOH-terminated siliconic polymer of a viscosity of 20000 cp and in an amount of 7.6%, 19.2% talc, 15% calcium carbonate, 50% silica sand, 6.8 Vaseline oil, 1.4% dibutylsebacate, until a homogeneous paste is obtained.

EXAMPLE 11

A mixture is prepared which consists of SiOH-terminated siliconic polymer of a viscosity of 20000 cp and in an amount of 7.6%, 19.2 talc, 15% calcium carbonate, 50% silica sand, 6.8% Vaseline oil, 1.4% 2-ethylhexyl adipate, until a homogeneous paste is obtained.

EXAMPLE 12

A mixture is prepared which consists of SiOH-terminated siliconic polymer of a viscosity of 20000 cp and in an amount of 7.6%, 19.2% talc, 15% calcium carbonate, 50% silica sand, 6.8% Vaseline oil, 1.4% acetyl-tri-n-butylcitrate, until a homogeneous paste is obtained.

EXAMPLE 13

A mixture is prepared which consists of SiOH-terminated siliconic polymer of a viscosity of 20000 cp and in an amount of 7.6%, 19.2% talc, 15% calcium carbonate, 50% silica sand, 6.8% Vaseline oil, 1.4% acetyl-tri-n-hexylcitrate, until a homogeneous paste is obtained.

EXAMPLE 14

The products of Examples 7–13 are extruded as pointed out in Example 5 to evaluate fluidity of same and a catalyst is added as in Example 6 to evaluate the final opacity thereof.

The obtained data are set out in the following Table

| Properties | 7 | 8 | 9 | 10 | 11 | 12 | 13 |
|---|---|---|---|---|---|---|---|
| Extrusion time (s) | 55 | 34 | 28 | 31 | 30 | 30 | 29 |
| Viscosity (Pas) | 785 | 297 | 236 | 269 | 256 | 465 | 348 |
| Surface Opacity | + | ++++ | ++++ | ++++ | ++++ | ++++ | +++ |

It is possible to see that in the compositions referring to Examples 8–13 there is a greater fluidity than in the Control Example 7 and at the same time the hardened product is more opaque.

What is claimed is:

1. A bicomponent composition containing a siliconic polymer and a catalyst, wherein it further comprises at least one compound selected from:
a citrate or a diester of a citric acid, wherein said diester of the citric acid is selected from the compounds of formula (IV):

$$XO-C\ COOR^3(CH_2COOR^3)_2 \qquad (IV)$$

wherein the group $R^3$ is a linear or branched saturated alkyl group comprising 1 to 15 carbon atoms; and the group X can be an atom of hydrogen or an ester group of the type $(R^3_aCO-)$ wherein $R^3_a$ is a linear or branched saturated alkyl group comprising 1 to 15 carbon atoms.

2. The composition as claimed in claim 1, wherein it further comprises a hydrocarbon oil.

3. The composition as claimed in claim 2, wherein said hydrocarbon oil is Vaseline oil.

4. The composition as claimed in claim 1, wherein it further comprises an inert material selected from: inert fillers, mineral fillers, organic and/or inorganic pigments.

5. The composition as claimed in claim 1, wherein said siliconic polymer is selected from: reactive siliconic polymers, unreactive siliconic polymers or mixtures thereof.

6. The composition as claimed in claim 5, wherein said siliconic polymer or mixture of siliconic polymers is selected from the group consisting of polymers of formula:

$$A_n\text{—}SiR^1{}_{3-n}O(SiR^1{}_2O)_mSiR^1{}_{3-n}\text{—}A_n \quad (I)$$

wherein:
$R^1$ is selected either from a linear or branched and possibly substituted saturated or unsaturated hydrocarbon; or from an aromatic group;
n is selected from an integer included between 1 and 3;
m is selected from an integer included between 10 and 15000;
A is a hydrolysable Y group or an hydroxyl group or a non hydrolysable $R^2$ group wherein:
  Y is selected from amino, acylamino, aminoxy, oximo, alkoxy, acyloxy and alkylamino groups.
  n is as above defined, and
  $R^2$ is defined as $R^1$.

7. The composition as claimed in claim 6, wherein $R^1$ is selected from:
  methyl, ethyl, propyl, butyl, hexyl, octyl radicals;
  vinyl, allyl, butadienyl radicals;
  phenyl, alkylaryl radicals;
  3,3,3-trifluoropropyl, chlorophenyl, bromotolyl, cyanoalkyl radicals;
  radicals of styrene, ethylene, vinylacetate.

8. The composition as claimed in claim 6, wherein A is selected from:
  an hydroxyl group; or
  a hydrolysable $Y_n$ group; wherein $Y_n$ is selected from: n-butylamino, sec-butylamino, cyclohexylamino, benzoylmethylamino, dimethylaminoxy, diethylaminoxy, dipropylaminoxy, acetophenone oximo, acetone oximo, benzophenone oximo, methylethyl ketoximo, diisopropyl ketoximo, metoxy, etoxy, n-propoxy, isopropoxy, butoxy, hexyloxy, heptyloxy, octyloxy, formyloxy, acetoxy, propionyloxy, caproyloxy, or stearoiloxy.

9. The composition as claimed in claim 6, wherein said siliconic polymer or mixture of siliconic polymers are selected from a polymer of formula (II):

$$R^2{}_n\text{—}SiR^1{}_{3-n}O(SiR^1{}_2O)_mSiR^1{}_{3-n}\text{—}R^2{}_n \quad (II)$$

wherein $R^1$ is as above defined; and $R^2$ is a non hydrolysable group.

10. The composition of claim 9, wherein $R^1$ and $R^2$ are alkyl groups.

11. A process for the preparation of a composition as claimed in claim 1, comprising the following steps:
  mixing a siliconic polymer, an inert material, a hydrocarbon oil and a compound selected from: a citrate or a diester of a citric acid until a homogeneous paste is obtained;
  adding the catalyst to said homogeneous paste at the moment of use of the composition.

12. A process for the preparation of a composition as claimed in claim 1 comprising the following steps:
  mixing a siliconic polymer, an inert material, a hydrocarbon oil until a homogeneous paste is obtained;
  adding the catalyst and a compound selected from: a citrate or a diester of a citric acid to said homogeneous paste at the moment of use.

13. A process for laying ceramic or sanitary articles of manufacture that comprises a step in which the composition as claimed in claim 1 is applied on said ceramic or sanitary articles.

14. The composition of claim 1, wherein $R^3$ is selected from n-butyl, n-hexyl, 2-ethylhexyl, octyl, decyl, octyldecyl groups.

15. The composition of claim 1, wherein $R^3{}_a$ is the $(CH_3\text{—})$ or $(CH_3(CH_2)_2\ CH_2\text{—})$ group.

* * * * *

UNITED STATES PATENT AND TRADEMARK OFFICE
CERTIFICATE OF CORRECTION

PATENT NO. : 6,852,796 B2
DATED : February 8, 2005
INVENTOR(S) : Massimo Rossi et al.

It is certified that error appears in the above-identified patent and that said Letters Patent is hereby corrected as shown below:

Column 11,
Line 8, please delete "SIR", and insert therefor -- SiR --.

Signed and Sealed this

Twelfth Day of July, 2005

JON W. DUDAS
*Director of the United States Patent and Trademark Office*